(12) United States Patent
Ströbel-Fröschle et al.

(10) Patent No.: US 12,274,197 B2
(45) Date of Patent: Apr. 15, 2025

(54) METHOD FOR PLANNING THE SPREADING OF A SPREADING MATERIAL MIXTURE

(71) Applicant: Amazonen-Werke H. Dreyer SE & Co. KG, Hasbergen (DE)

(72) Inventors: Markus Ströbel-Fröschle, Georgsmarienhütte (DE); Bernd Scheufler, Hasbergen (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 575 days.

(21) Appl. No.: 17/297,203

(22) PCT Filed: Nov. 14, 2019

(86) PCT No.: PCT/EP2019/081264
§ 371 (c)(1),
(2) Date: May 26, 2021

(87) PCT Pub. No.: WO2020/109009
PCT Pub. Date: Jun. 4, 2020

(65) Prior Publication Data
US 2022/0022368 A1    Jan. 27, 2022

(30) Foreign Application Priority Data
Nov. 26, 2018   (DE) .................... 10 2018 129 714.9

(51) Int. Cl.
*A01C 21/00*    (2006.01)
*G05B 19/416*   (2006.01)

(52) U.S. Cl.
CPC .......... *A01C 21/007* (2013.01); *G05B 19/416* (2013.01); *G05B 2219/45017* (2013.01)

(58) Field of Classification Search
None
See application file for complete search history.

(56) References Cited

U.S. PATENT DOCUMENTS

2011/0093169 A1* 4/2011 Schroeder .......... A01D 41/1243
701/50

FOREIGN PATENT DOCUMENTS

BR    112021009831 A2    8/2021
CA       3128221 A1      6/2020
(Continued)

OTHER PUBLICATIONS

International Preliminary Report on Patentability issued May 25, 2021 in corresponding PCT Application No. PCT/EP2019/081264.
(Continued)

*Primary Examiner* — Sean Shechtman
(74) *Attorney, Agent, or Firm* — Mintz Levin Cohn Ferris Glovsky and Popeo, P.C.

(57) ABSTRACT

A method for planning spreading of a spreading material mixture with an agricultural spreading machine includes steps of: identifying individual components of the spreading material mixture, determining component-related setting parameters for the agricultural spreading machine for a planned spreading operation for several or all of the individual components of the spreading material mixture, and evaluating joint spreadability of the individual components of the spreading material mixture on the basis of the determined component-related setting parameters by a calculating device.

13 Claims, 1 Drawing Sheet

(56) References Cited

FOREIGN PATENT DOCUMENTS

| DE | 102018129714 A1 | 5/2020 | | |
|---|---|---|---|---|
| EP | 2 957 161 A1 | 12/2015 | | |
| EP | 3 017 681 A1 | 5/2016 | | |
| EP | 3 087 817 A1 | 11/2016 | | |
| EP | 3087817 | * | 11/2016 | ............. A01C 17/00 |
| WO | 2020109009 A1 | 6/2020 | | |

OTHER PUBLICATIONS

International Search Report issued Feb. 3, 2020 in corresponding PCT Application No. PCT/EP2019/081264.

* cited by examiner

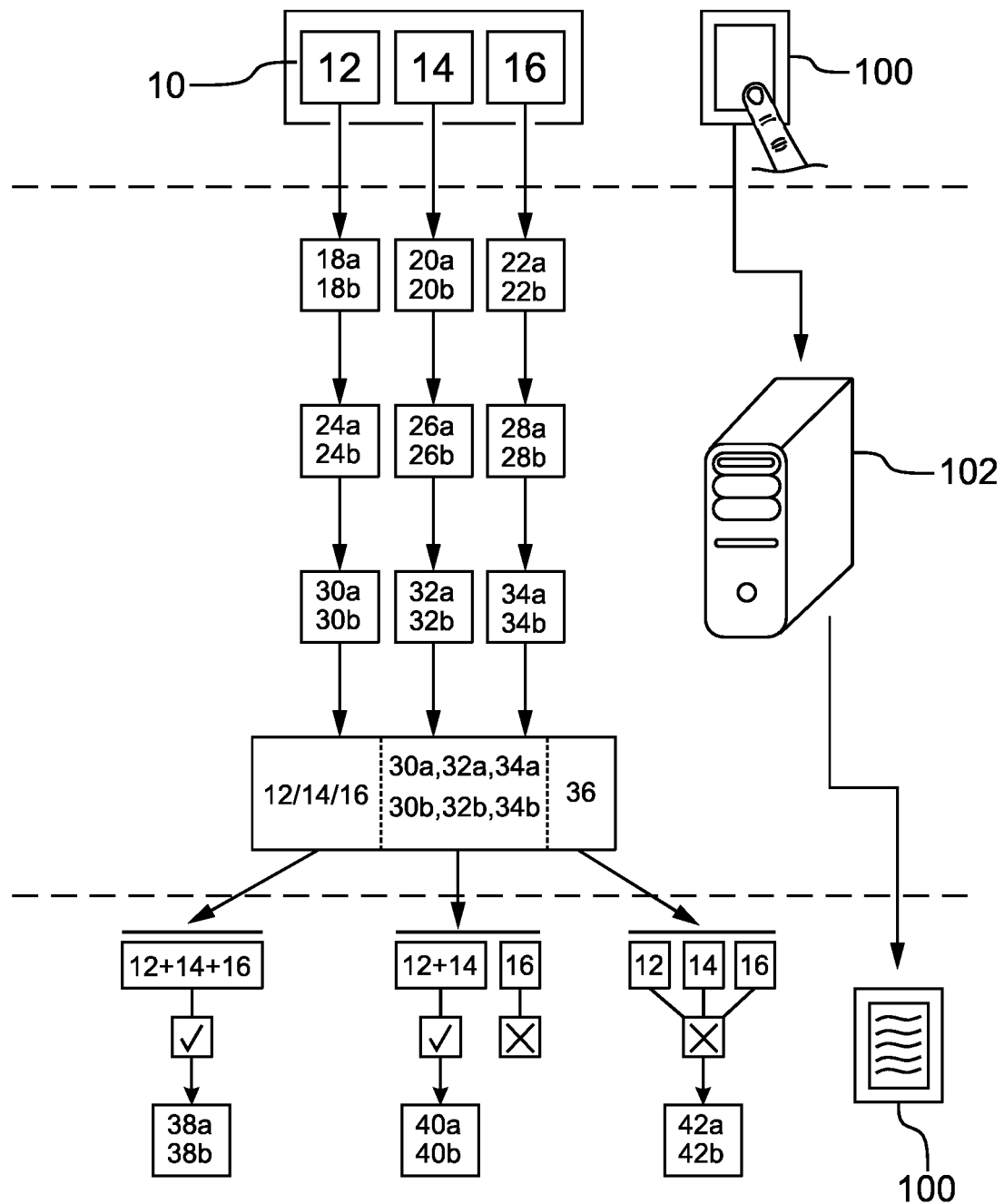

METHOD FOR PLANNING THE SPREADING OF A SPREADING MATERIAL MIXTURE

The invention relates to a method for planning the spreading of a spreading material mixture.

Spreading material mixtures with a plurality of individual components, such as, for example, fertilizer mixtures that contain several individual fertilizers, are enjoying increasing popularity, since the time and personnel required for spreading the spreading material can be considerably reduced by the simultaneous spreading of several individual components. In practice, however, it has been shown that it is not always possible to apply individual components of a spreading mixture together, so that it is often impossible, upon applying the corresponding spreading mixtures, to avoid misapplication of individual or all components of the spreading mixtures. The misapplications result, for example, in a non-uniform distribution of individual or all components of the spreading material mixture on the agricultural land.

Until now there is no method known In the prior art, with which the application of a spreading material mixture with an agricultural spreading machine can be reliably planned.

The object, the present invention is based on, is therefore the capability of assessing the joint spreadability of individual components of a spreading material mixture for planning a spreading operation better than has been possible to date.

The object is solved by a method of the type mentioned at the beginning, wherein component-related setting parameters for the agricultural spreading machine are first determined for a planned spreading operation for several or all individual components of the spreading material mixture. Subsequently, an evaluation of the joint spreadability of the individual components of the spreading material mixture is carried out on the basis of the determined component-related setting parameters by a calculation device.

The invention takes advantage of the knowledge that component-related setting parameters for the agricultural spreading machine may be readily determined for the respective individual components of the spreading material mixture, wherein the joint spreadability of the individual components of the spreading material mixture can be reliably assessed by comparing the component-related setting parameters for the agricultural spreading machine of the individual components.

The calculation device is preferably a data processing device. The method may be at least partially or entirely a computer-implemented method.

The spreading material mixture may be a fertilizer mixture, in which case the individual components of the spreading material mixture are preferably individual fertilizers. The component-related setting parameters for the agricultural spreader preferably relate to component-related ejection angles, component-related setting values for the feed point of the individual component onto the spreading disc, component-related throwing distances and/or component-related spreading disc speeds for the planned spreading operation. Furthermore, the component-related setting parameters for the agricultural spreading machine may relate to component-related opening sizes, opening shapes and/or opening positions of a spreading material feed opening of the agricultural spreading machine for the planned spreading operation. Alternatively or additionally, the component-related setting parameters for the agricultural spreading machine may relate to component-related blade positions, blade inclinations, blade orientations and/or blade lengths of one or more throwing blades of the spreading disc of the agricultural spreading machine for the planned spreading operation, if the spreading is to be carried out via spreading discs with throwing blades. Furthermore, the component-related setting parameters for the agricultural spreading machine may relate to component-related chute inclinations, chute orientations and/or chute positions for the planned spreading operation, if the spreading material is to be guided via a feed chute of the agricultural spreading machine for spreading. Alternatively or additionally, the component-related setting parameters for the agricultural spreader may relate to component-related spreading disc types, component-related spreading disc geometries and/or component-related throwing blade types. The planned spreading operation preferably specifies the operational width to be maintained.

In a preferred embodiment of the inventive method invention, a result of the evaluation of the joint spreadability of the individual components of the spreading material mixture is output via an electronic device. The electronic device may be, for example, a mobile terminal, a personal computer or an input and/or output device of the agricultural spreading machine. The result of the evaluation of the joint spreadability of the individual components of the spreading material mixture is preferably output via a visual display of the result.

Furthermore, an inventive method is advantageous, in which a user has the possibility of defining the individual components and preferably the mixing ratio of the individual components by means of an electronic device. The result of the evaluation of the joint spreadability of the individual components of the spreading material mixture is preferably output via the electronic device providing the input possibility. The possibility or capability that allows defining of the individual components and preferably the mixing ratio of the individual components may be an input capability, which allows the manual definition of the individual components and preferably their mixing ratio by the user. The individual components and preferably their mixing ratio can also be defined by scanning one or more machine-readable codes, such as QR codes. The individual components and preferably their mixing ratio may also be defined via radio messages. The electronic device may be a mobile terminal, a personal computer or an input and/or output device of the agricultural spreader. Preferably, the mixing ratio is also taken into account when evaluating the joint spreadability of the individual components of the spreading material mixture.

In a further embodiment of the method according to the invention, detecting the individual components of the spreading material mixture and/or determining the component-related setting parameters are carried out by the calculation device. The calculation device is preferably a component of a central computer system, the electronic device or the agricultural spreading machine. For determining the component-related setting parameters, component-related spreading data is preferably retrieved from a database, in particular from a spreading database. The retrieval of the component-related spreading data can be performed via the calculation device. Component-related material properties, component-related flight and/or spreading properties and/or component-related setting parameters of the individual components of the spreading material mixture may be stored on the database. Retrieving the component-related spreading data from the database may correspondingly comprise retrieving component-related material properties, component-related flight and/or spreading properties and/or component-related setting parameters of the individual components of the spreading material mixture.

The method according to the invention is further advantageously embodied in that the evaluation of the joint spreadability of the individual components of the spreading material mixture comprises determining component-related lateral distributions for several or all individual components of the spreading material mixture assuming the respective component-related setting parameters. Alternatively or additionally, evaluating the joint spreadability of the individual components of the spreading material mixture comprises determining component-related lateral distributions for several or all individual components of the spreading material mixture assuming different setting parameters within the spectrum of the determined component-related setting parameters of the individual components of the spreading material mixture. If component-related lateral distributions are determined for several or all individual components of the spreading material mixture assuming different setting parameters within the spectrum of the determined component-related setting parameters of the individual components of the spreading material mixture, it may be checked whether potential setting parameters, which deviate from the component-related setting parameters, lead to a satisfactory spreading result for several or all individual components of the spreading material mixture.

Furthermore, a method according to the invention is preferred, in which the evaluation of the joint spreadability of the individual components of the spreading material mixture comprises analyzing the existence of a spreading compatibility, according to which individual or all mutually compatible individual components of the spreading material mixture can be jointly spread with the agricultural spreading machine in such a way that their lateral distributions lie within a tolerance range. The tolerance range can be, for example, a tolerated non-uniformity with regard to the lateral distributions, so that mutually compatible individual components may be applied together so as to result in a tolerable non-uniformity of the individual components on the agricultural area. Furthermore, the evaluation of the joint spreadability of the individual components of the spreading material mixture may comprise analyzing the existence of a spreading incompatibility, according to which individual or all mutually incompatible individual components of the spreading material mixture cannot be jointly spread with the agricultural spreading machine in such a way that their lateral distributions lie within a tolerance range. The joint spreading of mutually incompatible individual components thus results, for example, in a non-tolerable non-uniformity of at least one individual component on the agricultural land.

The method according to the invention is further advantageously embodied in that the output of the result of the evaluation of the joint spreadability of the individual components of the spreading material mixture comprises the outputting the mutually compatible individual components of the spreading material mixture and/or outputting the mutually incompatible individual components of the spreading material mixture. The output informs the user, who is planning the application of the spreading material mixture, of the compatibility or incompatibility of the individual components of the spreading material mixture. The user may further be provided with an input option via an electronic device, by means of which at least one of the mutually incompatible individual components may be prioritized. Alternatively, an automatic prioritization of at least one of the mutually incompatible individual components may be performed by the calculation device. The automatic prioritization is performed in particular on the basis of the volatility of the mutually incompatible individual components of the spreading material mixture.

Furthermore, the method according to the invention may comprise analyzing the existence of one or more priority setting parameters, the setting of which on the agricultural spreading machine causes the lateral distribution of the at least one prioritized individual component of the mutually incompatible individual components of the spreading material mixture to lie within a tolerance range. Thus, the user, planning the spreading of the spreading material mixture and being aware of the incompatibility of the individual components of the spreading material mixture, may decide to spread the spreading material mixture despite the fact that at least one non-prioritized individual component is spread in an unscheduled, in particular non-uniform manner. Preferably, the one or more priority setting parameters are determined such that the non-uniformity in the distribution of the at least one non-prioritized individual component may be subsequently compensated for by additional spreading. The one or more priority setting parameters may relate to a priority ejection angle or ejection angle, a priority adjustment value for the feed point of the spreading material mixture onto the spreading disc, a priority throw distance, and/or a priority spreading disc speed. Further, the one or more priority setting parameters may relate to a priority opening size, opening shape, and/or opening position of a spreading material feed opening of the agricultural spreading machine. Further, the one or more priority setting parameters may relate to a priority blade position, blade pitch, blade orientation, and/or blade length of one or more throwing blades of the spreading disc of the agricultural spreading machine when spreading the spreading material mixture is to be performed via spreading discs having throwing blades. Further, the one or more priority setting parameters may relate to a priority chute inclination, chute orientation, and/or chute position when spreading the spreading mixture is to be performed via a feed chute of the agricultural spreading device. Further, the one or more priority setting parameters may relate to a priority spreading disc type and/or a priority spreading disc geometry and/or a priority throwing blade type.

In a further preferred embodiment of the method according to the invention, outputting the result of the evaluation of the joint spreadability of the individual components of the spreading material mixture comprises outputting the one or more priority setting parameters as setting recommendations for the agricultural spreading machine. The output priority setting parameters may then be set by the user, who is planning the spreading material application, at the agricultural spreading machine. Alternatively, the priority setting parameters may be set automatically by the agricultural spreading machine.

In a further embodiment of the method according to the invention, evaluating the joint spreadability of the individual components of the spreading material mixture comprises analyzing the existence of one or more compromise setting parameters, the setting of which at the agricultural spreading machine causes the lateral distributions of several or all of the individual components of the spreading material mixture to lie within a tolerance range. The one or more compromise setting parameters may relate to a compromise ejection angle, a compromise adjustment value for the feed point of the spreading material mixture onto the spreading disc, a compromise throw distance, and/or a compromise spreading disc speed. Further, the one or more compromise setting parameters may relate to a compromise opening size, opening shape, and/or opening position of a spreading material feed opening of the agricultural spreading machine. Further, the one or more compromise setting parameters may relate to a compromise blade position, blade pitch, blade orientation, and/or blade length of one or more throwing blades of the spreading disc of the agricultural spreading machine when the spreading of the spreading material mixture is to be performed via spreading discs having throwing blades. Further, the one or more compromise setting parameters may relate to a compromise chute inclination, chute orientation, and/or chute position when for spreading the spreading material mixture is to be fed via a feed chute of the agricultural spreading device. Further, the one or more compromise setting parameters may relate to a compromise spreading disc type and/or a compromise spreading disc geometry and/or a compromise spreading blade type.

In another preferred embodiment of the method according to the invention, outputting the result of the evaluation of the joint spreadability of the individual components of the spreading material mixture comprises outputting the one or more compromise setting parameters as setting recommendations for the agricultural spreading machine. The output compromise setting parameters may then be set on the agricultural spreader by the user planning the spreading operation. Alternatively, the compromise setting parameters may be set automatically by the agricultural spreading machine.

In a further embodiment of the method according to the invention, component-related spreading and/or flight properties are determined for several or all individual components of the spreading material mixture. The component-related setting parameters for the agricultural spreading machine for the planned spreading operation are preferably determined on the basis of the determined component-related spreading and/or flight properties. The component-related spreading and/or flight properties may relate to the particle size, the bulk density, the material density, the grade and/or the surface properties, in particular the surface roughness, of the respective individual components of the spreading material mixture. Alternatively or additionally, the component-related spreading and/or flight properties may relate to one or more throw distance characteristic values and/or one or more ejection angle characteristic values of the respective individual components of the spreading material mixture. The one or more throw distance characteristic values and/or the one or more ejection angle characteristic values are preferably in each case characteristic values, which relate to a standard spreading of the respective individual components with a standard spreading disc at a standard speed. The one or more characteristic throw distance values and/or the one or more characteristic ejection angle values may also be characteristic values, which relate to a standard output of the respective individual components with standardized blade settings and/or a standardized spreading material feed.

In a further embodiment of the method according to the invention, component-related material properties of several or all individual components of the spreading material mixture are determined. The component-related spreading and/or flight properties are preferably determined on the basis of the determined component-related substance properties. The component-related material properties may relate to the particle size, the bulk density, the material density, the grade and/or the surface properties, in particular the surface roughness, of the respective individual components of the spreading material mixture.

In a further embodiment of the method according to the invention, an alternative configuration of the agricultural spreading machine is determined, by means of which several or all individual components of the spreading material mixture may be applied in such a way that their lateral distributions lie within a tolerance range that is narrower than the range, in which the lateral distributions of the individual components of the planned configuration of the agricultural spreading machine lie. The alternative configuration of the agricultural spreading machine may, for example, relate to a spreading material application with an alternative spreading disc or an alternative spreading disc configuration.

Furthermore, a method according to the invention is advantageous, in which outputting the result of the evaluation of the joint spreadability of the individual components of the spreading material mixture comprises outputting the determined alternative configuration of the agricultural spreading machine as a configuration recommendation for the agricultural spreading machine. By outputting the determined alternative configuration, the user planning the spreading operation is informed of the possibility of improving the spreading result by changing the configuration accordingly. The user may then carry out the alternative configuration on the agricultural spreading machine, for example, mount an alternative spreading disc or change the configuration of the mounted spreading disc.

In the following, a preferred embodiment of the invention is explained and described in more detail with reference to the accompanying drawing. Here:

FIG. 1 shows an embodiment of the method according to the invention in a schematic representation.

FIG. 1 shows a system comprising an electronic device 100 and a calculation device 102, enabling performance of a method for planning the application of a spreading material mixture 10 with an agricultural spreading machine.

The electronic device 100 is designed as a mobile terminal and may be, for example, a smartphone or a tablet. An input and output device of the electronic device 100 designed as a touch screen provides a user with an input option, which enables the user to manually define the individual components 12-16 of the spreading material mixture 10 and the mixing ratio of the individual components 12-16 of the spreading material mixture 10. In this case, the spreading material mixture 10 is a fertilizer mixture and the individual components 12-16 are different individual fertilizers.

As an alternative to manual input by a user, the individual components 12-16 and their mixing ratio may be defined by scanning one or more machine-readable codes, such as QR codes, by the electrical device 100. Further, the definition of the individual components 12-16 and their mixing ratio may also be accomplished via one or more radio messages sent to the electronic device 100.

After the individual components 12-16 of the spreading material mixture 10 and their mixing ratio have been defined via the electronic device 100, this information is sent from the electronic device 100 to the calculation device 102. The calculation device 102 is a data processing device and, in the present embodiment, is part of a central computer operated by a manufacturer of agricultural spreading machines. In alternative embodiments, the calculation device 102 may also be a component of the electronic device 100 so that there is no need for a device-external transmission of the provided information regarding the spreading material mixture 10.

Based on the provided information, the calculation device 102 identifies the individual components 12-16 of the spreading material mixture 10 and their mixing ratio.

The calculation device 102 determines component-related material properties 18a, 18b, 20a, 20b, 22a, 22b of the individual components 12-16 of the spreading material mixture 10 by a database query from a spreading material database. The material properties 18a, 18b, 20a, 20b, 22a, 22b of the individual components 12-16 of the spreading material mixture 10 may, for example, relate to the particle size, the bulk density, the grade and/or the surface properties of the individual components 12-16 of the spreading material mixture 10.

Based on the determined component-related material properties 18a, 18b, 20a, 20b, 22a, 22b, the calculation device 102 then determines component-related spreading and/or flight properties 24a, 24b, 26a, 26b, 28a, 28b of the individual components 12-16 of the spreading material mixture 10. Alternatively, the spreading and/or flight properties 24a, 24b, 26a, 26b, 28a, 28b of the individual components 12-16 of the spreading material mixture 10 may be retrieved from a spreading material database by a database query. The component-related spreading and/or flight characteristics 24a, 24b, 26a, 26b, 28a, 28b may, for example, relate to throw distance characteristics and/or ejection angle characteristics of the respective individual components 12-16 of the spreading material mixture 10.

Based on the determined component-related spreading and/or flight characteristics 24a, 24b, 26a, 26b, 28a, 28b of the individual components 12-16 of the spreading material mixture 10, the calculation device 102 then determines component-related setting parameters 30a, 30b, 32a, 32b, 34a, 34b for the agricultural spreading machine for the planned spreading operation for all individual components 12-16 of the spreading material mixture 10. In the present embodiment, the component-related setting parameters 30a, 30b, 32a, 32b, 34a, 34b comprise component-related ejection angles 30a, 32a, 34a and component-related throw distances 30b, 32b, 34b of the individual components 12-16 of the spreading material mixture 10. In alternative embodiments, the component-related setting parameters 30a, 30b, 32a, 32b, 34a, 34b may also relate to other parameters. Alternatively, the component-related setting parameters 30a, 30b, 32a, 32b, 34a, 34b of the individual components 12-16 of the spreading material mixture 10 may be retrieved from a spreading database by a database query.

Taking into account the operational width 36 to be maintained of the planned spreading operation, the calculating device 102 then evaluates the joint spreadability of the individual components 12-16 of the spreading material mixture 10 based on the determined component-related setting parameters 30a, 30b, 32a, 32b, 34a, 34b and the mixing ratio of the individual components 12-16 of the spreading material mixture 10. Evaluating the joint spreadability of the individual components 12-16 of the spreading material mixture 10 comprises determining component-related lateral distributions for the individual components 12-16 of the spreading material mixture 10 assuming different setting parameters within the spectrum of the determined component-related setting parameters 30a, 30b, 32a, 32b, 34a, 34b of the individual components 12-16 of the spreading material mixture 10.

Based on the component-related lateral distributions for the individual components 12-16 of the spreading material mixture 10, the computing device 102 then examines or analyzes the existence of a spreading compatibility and the existence of a spreading incompatibility. In the presence of a spreading compatibility, individual or all mutually compatible individual components 12-16 of the spreading material mixture 10 may be applied together with the agricultural spreading machine in such a way that their lateral distributions are within a tolerance range. If there is a spreading incompatibility, individual or all mutually incompatible individual components 12-16 of the spreading material mixture 10 cannot be applied together with the agricultural spreading machine in such a way that their lateral distributions lie within a tolerance range.

In this context, FIG. 1 shows three different options.

According to the first option, the individual components 12-16 of the spreading material mixture 10 are compatible with each other and may be spread with the agricultural spreading machine in such a way that their lateral distributions lie within a tolerance range. In this first option, evaluating the joint spreadability of the individual components 12-16 of the spreading material mixture 10 comprises determining compromise setting parameters 38a, 38b, the setting of which on the agricultural spreading machine causes the lateral distributions of the individual components 12-16 of the spreading material mixture 10 to lie within the tolerance range. In this embodiment, the compromise setting parameters 38a, 38b include a compromise adjustment value 38a for the feed point of the spreading material mixture 10 onto the spreading disc and a compromise spreading disc speed 38b. In other embodiments, the compromise setting parameters 38a, 38b may be other parameters. After the evaluation of the joint spreadability of the individual components 12-16 of the spreading material mixture 10 is completed, the result of the evaluation is communicated to the electronic device 100 so that the electronic device 100 may output the result of the evaluation of the joint spreadability of the individual components 12-16 of the spreading material mixture 10. In accordance with this first option, outputting the result includes outputting the individual components 12-16 of the spreading material mixture 10, which are compatible with each other, and outputting the compromise setting parameters 38a, 38b as setting recommendations for the agricultural spreading machine.

According to the second option, the individual components 12, 14 of the spreading material mixture 10 are compatible with each other and may be spread with the agricultural spreading machine in such a way that their lateral distributions are within a tolerance range. At the same time, the individual components 12, 14 of the spreading material mixture 10 are incompatible with the individual component 16 of the spreading material mixture 10, so that the individual components 12, 14 on the one hand and the individual component 16 on the other hand cannot be spread with the agricultural spreading machine in such a way that their lateral distributions lie within a tolerance range. In this second option, the evaluation of the joint spreadability of the individual components 12-16 of the spreading material mixture 10 comprises the determination of compromise setting parameters 40a, 40b, the setting of which on the agricultural spreading machine causes the lateral distributions of the individual components 12, 14 of the spreading material mixture 10 to lie within the tolerance range. In this embodiment, the compromise setting parameters 40a, 40b include a compromise adjustment value 40a for the feed point of the spreading material mixture 10 onto the spreading disc and a compromise spreading disc speed 40b. In other embodiments, the compromise setting parameters 40a, 40b may be other parameters. After the evaluation of the joint spreadability of the individual components 12-16 of the spreading material mixture 10 is completed, the result of the evaluation is communicated to the electronic device 100 so that the electronic device 100 may output the result of the evaluation of the joint spreadability of the individual components 12-16 of the spreading material mixture 10. According to this second option, outputting the result comprises outputting the individual components 12, 14 of the spreading material mixture 10 that are compatible with each other and the individual component 16 that is incompatible with these individual components 12, 14. Furthermore, outputting the result comprises outputting the compromise setting parameters 40a, 40b as setting recommendations for the agricultural spreading machine.

According to the third option, the individual components 12-16 of the spreading material mixture 10 are entirely incompatible with each other and cannot be spread by the agricultural spreading machine in such a way that their lateral distributions are within a tolerance range. After the evaluation of the joint spreadability of the individual components 12-16 of the spreading material mixture 10 is completed, the result of the evaluation is transmitted to the electronic device 100 so that the electronic device 100 may output the result of the evaluation of the joint spreadability of the individual components 12-16 of the spreading material mixture 10. In this third possibility, outputting the result includes outputting the mutually incompatible individual components 12-16 of the spreading material mixture 10. However, the electronic device 100 may provided the user with an input option that allows the prioritizing of at least one of the mutually incompatible individual components 12-16. Alternatively, at least one individual component 12-16 may be automatically prioritized by the computing device 102, in particular based on the volatility of the mutually incompatible individual components 12-16. After an individual component 12-16 has been prioritized, priority setting parameters 42a, 42b may then be determined, the setting of which at the agricultural spreading machine causes the lateral distribution of the at least one prioritized individual component 12-16 of the mutually incompatible individual components 12-16 of the spreading material mixture 10 to be within a tolerance range, wherein the non-uniformities in the distribution of the non-prioritized individual components 12-16 may be subsequently compensated for by a separate spreading material application. The priority setting parameters 42a, 42b include a priority setting value 42a for the point of application of the spreading material mixture 10 to the spreading disc and a priority spreading disc speed 42b. In other embodiments, the priority setting parameters 42a, 42b may be other parameters.

Furthermore, the computing device 102 may also determine an alternative configuration of the agricultural spreading machine, by means of which several or all of the individual components 12-16 of the spreading material mixture 10 are spreadable in such a way that their lateral distributions are within a tolerance range that is less than the range, in which the lateral distributions of the individual components 12-16 lie, when applying the planned configuration of the agricultural spreading machine. For example, the alternative configuration of the agricultural spreading machine may involve the spreading of spreading material with an alternative spreading disc. When determining an alternative configuration of the agricultural spreading machine, outputting the result of evaluating the joint spreadability of the individual components 12-16 of the spreading material mixture 10 includes outputting the determined alternative configuration of the agricultural spreading machine as a configuration recommendation for the agricultural spreading machine.

The execution of the method steps executed by the calculation device 102 and/or the execution of the method steps executed by the electronic device 100 is thereby computer-implemented.

REFERENCE NUMERALS

10 Spreading material mixture
12-16 Individual components
18a, 18b Material properties
20a, 20b Material properties
22a, 22b Material properties
24a, 24b Spreading and/or flight properties
26a, 26b Spreading and/or flight properties
28a, 28b Spreading and/or flight properties
30a, 30b Setting parameters
32a, 32b Setting parameters
34a, 34b Setting parameters
36 Operational width
38a, 38b Compromise setting parameters
40a, 40b Compromise setting parameters
42a, 42b Priority setting parameters
100 Electronic device
102 Calculation device

The invention claimed is:

1. A computer-implemented method for planning spreading of a spreading material mixture with an agricultural spreading machine, comprising the steps of:
   identifying individual components of the spreading material mixture;
   determining component-related setting parameters for the agricultural spreading machine for a planned spreading operation for several or all of the individual components of the spreading material mixture;
   evaluating, based on the determined component-related setting parameters by a calculating device, joint spreadability of the individual components of the spreading material mixture, wherein the evaluating joint spreadability of the individual components of the spreading material mixture comprises determining an existence of one or more compromise setting parameters, wherein a setting of said one or more compromise setting parameters on the agricultural spreading machine results in the lateral distributions of several or all of the individual components of the spreading material mixture to be within a tolerance range, the tolerance range being a tolerated non-uniformity with regard to the lateral distributions of the individual components of the spreading mixture;
   automatically setting, by the agricultural spreading machine, the one or more compromise setting parameters for laterally distributing several or all of the individual components of the spreading material mixture to be within the tolerance range, the setting of the one or more compromise setting parameters being based on the evaluation of the joint spreadability of the individual components of the spreading material mixture; and
   distributing the spreading material mixture with the agricultural spreading machine using the one or more compromise setting parameters.

2. The computer-implemented method according to claim 1, further comprising the step of:
   outputting a result of the evaluation of the joint spreadability of the individual components of the spreading material mixture via an electronic device.

3. The computer-implemented method according to claim 1, further comprising the step of:
providing, by an electronic device, a user with an ability of defining the individual components.

4. The computer-implemented method according to claim 1, wherein evaluating the joint spreadability of the individual components of the spreading material mixture comprises at least one of the following steps:
determining component-related lateral distributions for several or all of the individual components of the spreading material mixture based on the respective component-related setting parameters;
determining component-related lateral distributions for several or all of the individual components of the spreading material mixture based on different setting parameters within a spectrum of the determined component-related setting parameters of the individual components of the spreading material mixture.

5. The computer-implemented method according to claim 2, wherein evaluating the joint spreadability of the individual components of the spreading material mixture comprises at least one of the following steps:
analyzing an existence of a spreading compatibility that enables individual or all mutually compatible individual components of the spreading material mixture to be spread together with the agricultural spreading machine in such a way that their lateral distributions lie within a tolerance range;
analyzing an existence of a spreading incompatibility that does not enable individual or all mutually incompatible individual components of the spreading mixture to be spread together with the agricultural spreading machine in such a way that their lateral distributions lie within a tolerance range.

6. The computer-implemented method according to claim 5, wherein the outputting of the result of the evaluation of the joint spreadability of the individual components of the spreading material mixture comprises at least one of the following steps:
outputting the mutually compatible individual components of the spreading material mixture;
outputting the mutually incompatible individual components of the spreading material mixture.

7. The computer-implemented method according to claim 1, further comprising the step of:
determining component-related spreading or flight properties for several or all of the individual components of the spreading material mixture.

8. The computer-implemented method according to claim 1, further comprising the step of:
determining component-related material properties of several or all of the individual components of the spreading material mixture.

9. The computer-implemented method according to claim 1, further comprising the step of:

determining an alternative configuration of the agricultural spreading machine, which enables several or all of the individual components of the spreading material mixture to be applied in such a way that their lateral distributions lie within a tolerance range which is narrower than the range, in which the lateral distributions of the individual components lie with a planned configuration of the agricultural spreading machine.

10. The computer-implemented method according to claim 9, wherein outputting a result of the evaluation of the joint spreadability of the individual components of the spreading material mixture comprises the following step:

outputting the determined alternative configuration of the agricultural spreading machine as a configuration recommendation for the agricultural spreading machine.

11. The computer-implemented method according to claim 3, further comprising the steps of:

providing, by the electronic device, an ability to define a mixing ratio of the individual components.

12. The computer-implemented method according to claim 7, wherein the component-related setting parameters for the agricultural spreading machine for the planned spreading operation are determined on the basis of the determined component-related spreading or flight properties.

13. The computer-implemented method according to claim 8, wherein component-related spreading or flight properties are determined on the basis of the determined component-related material.

* * * * *